Sept. 27, 1966    B. J. MAYLAND    3,275,403
REMOVAL OF CARBON DIOXIDE AND HYDROGEN
SULFIDE FROM GASEOUS MIXTURES
Filed Aug. 22, 1962
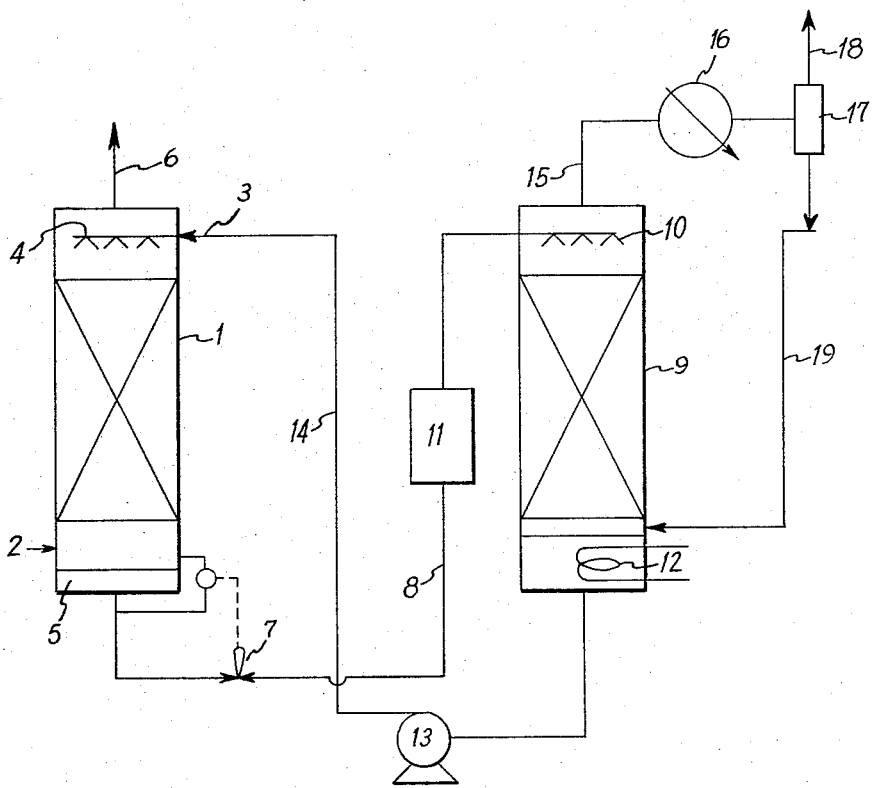
INVENTOR.
BERTRAND J. MAYLAND,
BY
Youngblut, Melville, Strasser and Foster
ATTORNEYS.

United States Patent Office 3,275,403
Patented Sept. 27, 1966

3,275,403
REMOVAL OF CARBON DIOXIDE AND HYDROGEN SULFIDE FROM GASEOUS MIXTURES
Bertrand J. Mayland, Jeffersontown, Ky., assignor to Girdler Corporation, Louisville, Ky., a corporation of Ohio
Filed Aug. 22, 1962, Ser. No. 218,645
7 Claims. (Cl. 23—3)

The invention has to do with the purification of gaseous mixtures such as natural gas, coke oven gas, producer gas and the various synthesis gases by the removal of contaminants of which carbon dioxide is the principal ingredient in terms of volume, but where hydrogen sulfide is present in substantial amounts.

A hot potassium carbonate solution in a regenerative scrubbing process can be used to remove both carbon dioxide and hydrogen sulfide. Where only carbon dioxide is present as a contaminant there are no severe problems of precipitation and plugging; and if corrosion is encountered it can generally be controlled by the use of a potassium dichromate inhibitor.

However, where the gas being treated contains a substantial quantity of hydrogen sulfide, the use of a potassium dichromate inhibitor is not possible. The hydrogen sulfide is oxidized to non-regenerable thiosulfates, and the dichromate is reduced and precipitated as an insoluble oxide. The reaction is quantitative in a scrubbing system such as is used for the purification of gases, and where hydrogen sulfide is present in appreciable quantities a corrosion inhibitor cannot be used.

The bare omission of a corrosion inhibitor does not, however, solve the problem. As is well known, the conditions of a scrubbing operation with a hot potassium carbonate solution expose the steel surfaces of the apparatus to severe corrosion which is a continuing source of iron ions in the scrubbing solution during the operation of the process. There are also other sources of iron ions which must be taken into account. Where the gases being scrubbed contain carbon monoxide and conditions are favorable, additional iron can be carried into the scrubbing solution as iron carbonyl vapor. Catalyst dust or corrosion products from parts of a treatment system ahead of the scrubbing constitute additional sources of iron ions. When hydrogen sulfide is present the iron from all of these sources is precipitated in the carbonate scrubbing solution as iron sulfide.

It will be obvious that if the scrubbing system is to remain in operative condition, the precipitated iron sulfide must be removed from the solution at a rate equal to its rate of formation. Filtration is the most available expedient; but the iron sulfide formed under the conditions outlined is extremely difficult to filter from the solution with any commercially practicable apparatus, and the result is that a relatively high concentration of the iron sulfide is usually carried in the circulating solution. The precipitated iron sulfide has a strong tendency to cling to or collect upon the surfaces of apparatus used in the process, and the result is the plugging of columns, necessitating expensive shutdowns.

The primary object of this invention is the provision of a procedure which will minimize the above noted disadvantages.

It is also an object of the invention to provide a procedure for the removal of carbon dioxide and hydrogen sulfide from gaseous mixtures, which procedure will be more efficient than any heretofore devised.

These and other objects of the invention which will be set forth hereinafter or will be apparent to one skilled in the art upon reading these specifications are accomplished by that process of which an exemplary embodiment will now be described. Reference is made to the accompanying drawing which diagrammatically illustrates an apparatus with which the invention may be practiced.

In the practice of the invention the gas to be purified enters an absorber tower 1 at 2 and passes upwardly in countercurrent to a solution of potassium carbonate entering the tower at 3 and sprayed downwardly therein by a series of nozzles 4. The tower may, if desired, contain bubble trays to bring about intimate contact of the gases and the solution; but for practical purposes an adequate result may be accomplished by packing the tower with rings. The descending solution absorbs both carbon dioxide and hydrogen sulfide from the gases, and collects in the bottom of the tower at 5. The purified gases exit at 6 from the top of the tower.

Ordinarily, the absorber operates at a higher pressure level than the regenerator so that the bicarbonate solution from the sump 5 flows through a control valve 7 and a conduit 8 to the top of a desorber or reactivator tower 9 wherein it is sprayed downwardly through nozzles 10. In view of the precipitation of iron as iron sulfide in the solution, filtering means 11 should be included in the conduit 8.

The tower 9 may also be packed with rings. The solution collects in the bottom of the tower where it is heated to the boiling point by suitable means such as superheated steam in a coil 12. The potassium carbonate solution in the tower 1 will largely have been converted to potassium bicarbonate through the absorption of carbon dioxide from the gases. In the regenerator tower 9 the vapors from the boiling solution pass upwardly in countercurrent to the descending bicarbonate solution, abstracting carbon dioxide from it thus reconverting the bicarbonate to potassium carbonate. The regenerated solution is transferred by a pump 13 through a conduit 14 to the top of the absorber tower 1.

The gaseous effluent consisting primarily of moisture and carbon dioxide passes from the regenerator tower 9 through a conduit 15 to a heat exchanger 16 wherein its temperature is lowered sufficiently to permit condensation of the moisture vapor which is then separated from the carbon dioxide by a separator 17. The carbon dioxide is carried away by a conduit 18 to be used elsewhere, while the separated water is returned by a conduit 19 to the scrubbing solution at a convenient point such as the base of the regenerator tower, so as to maintain the desired solution concentration.

There has been described above a simplified form of apparatus with which the process of this invention may be practiced. More elaborate systems may be employed, including variants of the regenerative and absorption steps, and by way of illustration reference is made to the copending application of the present inventor and Carl Robert Trimarke entitled, "Apparatus and Method for Removing Carbon Dioxide From Process Gases," Serial No. 137,601, filed September 12, 1961, and now abandoned. However, the apparatus herein illustrated will serve as a diagrammatic showing of apparatus with which the present process may be practiced.

It has already been indicated that where the gaseous mixtures to be treated contain considerable amounts of hydrogen sulfide, the ordinary corrosion inhibitors of which potassium dichromate is exemplary cannot be used. It has also been indicated that the reaction between hydrogen sulfide and iron in the scrubbing solution forms iron sulfide in a condition which is not only very difficultly filterable but also has a strong tendency to hang up in apparatus elements so as to give rise to plugging. The present invention is based on the discovery that certain amines such as monoethanolamine (MEA), diethanolamine (DEA) and triethanolamine (TEA) exert a remarkable effect upon the condition in which the iron sulfide precipitates. Of the three amines mentioned above, DEA produces the best effect.

The effect may be demonstrated in the following way:

Two solutions were made up in transparent laboratory vessels. Each solution was based on a 30% $K_2CO_3$ solution which is a typical concentration in a gas scrubbing process. However, each solution was treated to convert 50% of the $K_2CO_3$ to the bicarbonate form, $KHCO_3$; and to each solution there was added 0.1% $FeSO_4$ to serve as a source of iron ions. To one of the solutions 2% DEA was added. These solutions were treated at 200° F. with a gas containing 1% $H_2S$, by bubbling the gas through the solutions. In each solution a precipitate of FeS formed quite rapidly.

After the described treatment the solutions were allowed to settle, and it was observed that the FeS settled out twice as fast from the solution containing DEA as it did from the other solution. It was also observed that the particles of the FeS precipitate were definitely larger in the solution containing DEA than the other solution. Attempts to filter both solutions indicated that the solution containing DEA filtered much more easily than the other solution. No difference in the rate of FeS formation was observed in the test.

As a typical example of the operation of the process, the following is given:

Example

In a commercial plant for scrubbing crude ammonia synthesis gas, it was found that the gas contained 1% $H_2S$. In this plant it was also found that the conditions were favorable for the formation of iron carbonyl, and that some iron based catalyst dust reached the carbonate scrubber. Throughout the operation of this plant the plugging of the packing in the absorber tower had been a continuing problem. When a high plant production rate was maintained, serious pluggage developed in less than six months, necessitating either an immediate shutdown or operation at a greatly reduced rate. For example, the columns were cleaned in July of one year. Trouble was indicated in the early Fall of the same year, and another shutdown for cleaning was necessary in November of the same year.

When, however, 2% of DEA was added to the system the plugging difficulty was eliminated, and apparently permanently eliminated. In fact, an examination of the packing in the regenerator tower (where trouble was also encountered) showed the packing to be free of iron sulfide deposits, although the examination was made long after a shutdown for cleaning would have been necessary prior to the addition of the DEA.

The specific strength of the potassium carbonate solution is not a limitation on this invention, but the strength will normally lie between 18 and 40%. The amount of any of the amines listed above (or mixtures of them) required to attain the objects of this invention is small and will usually lie between 0.5% and 2%. More may be used if desired, but this increases the expense of the process without effecting a proportionate increase in advantages. In the practice of the invention, the strength of the amine in the solution may be made up by periodic addition of increments as depletion is noted upon test.

It is believed also that the presence of the amine diminishes corrosion to some extent, since corrosion appears to become stabilized at a reasonable value after the process has been in operation for some hours. In a copending application entitled, "The Removal of Carbon Dioxide From Gaseous Mixtures," Serial No. 104,559, filed April 21, 1961, now Patent No. 3,144,301, the present inventor has described a process including the use of amines for increasing the efficiency of carbon dioxide scrubbing, and a process in which amines may be employed as additives to a potassium carbonate solution to which corrosion inhibitors are also added, which process is effective where the gas being treated contains no hydrogen sulfide or only a nugatory amount thereof. In the present case applicant intends to cover a process of treating gases containing appreciable amounts of hydrogen sulfide where the action of the amine is to control the precipitation of iron sulfide and its removal from the circulatory system.

Modifications may be made in the invention without departing from the spirit of it. The invention having been described in certain exemplary embodiments, what is claimed as new and desired to be secured by Letters Patent is:

1. In a regenerative process for removing contaminants, including carbon dioxide as the principal contaminant and hydrogen sulfide as a substantial contaminant, from gaseous mixtures, wherein the contaminated gaseous mixtures are brought into intimate contact with a solution of potassium carbonate, said solution containing iron ions resulting in the production of a difficultly filtrable iron sulfide precipitate, the step of maintaining in the said solution from about .5% to about 2% of an amine chosen from the class consisting of monethanolamine, diethanolamine, triethanolamine and mixtures thereof, to cause said iron sulfide to precipitate at an increased rate and with a larger particle size, thereby making said precipitate readily filtrable, and filtering said precipitate from said solution.

2. The process claimed in claim 1 wherein the process is carried on in an apparatus presenting steel surfaces to said solution.

3. The process claimed in claim 2 in which said solution is a concentrated solution of potassium carbonate of a strength substantially between 18% and 40%.

4. The process claimed in claim 3 wherein the strength of said amine in said solution is made up by periodic addition of increments of said amine as depletion is noted upon test.

5. The process claimed in claim 4 wherein said gaseous mixtures contain carbon monoxide and in which conditions are favorable for carrying iron into said solution in the form of iron carbonyl vapor.

6. In a regenerative process for removing contaminants including carbon dioxide as a principal contaminant and hydrogen sulfide as a substantial contaminant, from gaseous mixtures, wherein the contaminated gaseous mixtures are brought into intimate contact with a solution of potassium carbonate, containing iron ions resulting in the production of a difficultly filtrable iron sulfide precipitate, the step of maintaining in the solution a content of substantially 0.5% to 2% of an amine chosen from a class consisting of monoethanolamine, diethanolamine, triethanolamine and mixtures thereof and removing said precipitated iron sulfide from said solution substantially at a rate equal to its rate of formation.

7. The regenerative process claimed in claim 6 in which the gaseous mixtures are treated with said solution in an absorber whereby a part at least of the potassium carbonate is converted to potassium bicarbonate, thus forming a spent solution, in which the spent solution is transferred to a regenerator in which carbon dioxide is removed therefrom so as to form a regenerated solution, wherein the said regenerated solution is transferred to said absorber, and wherein the said spent solution is continuously filtered during its transfer from the absorber to the regenerator.

References Cited by the Examiner

UNITED STATES PATENTS

| | | | |
|---|---|---|---|
| 2,840,450 | 6/1958 | Giammarco | 23—2 |
| 2,993,750 | 7/1961 | Giammarco | 23—2 |
| 3,144,301 | 8/1964 | Mayland | 23—2 |

OSCAR R. VERTIZ, *Primary Examiner.*

MAURICE A. BRINDISI, *Examiner.*

E. C. THOMAS, *Assistant Examiner.*